Oct. 12, 1954     S. LEHMANN, JR     2,691,365
EXPANSION ENGINE
Filed May 21, 1953     6 Sheets-Sheet 1
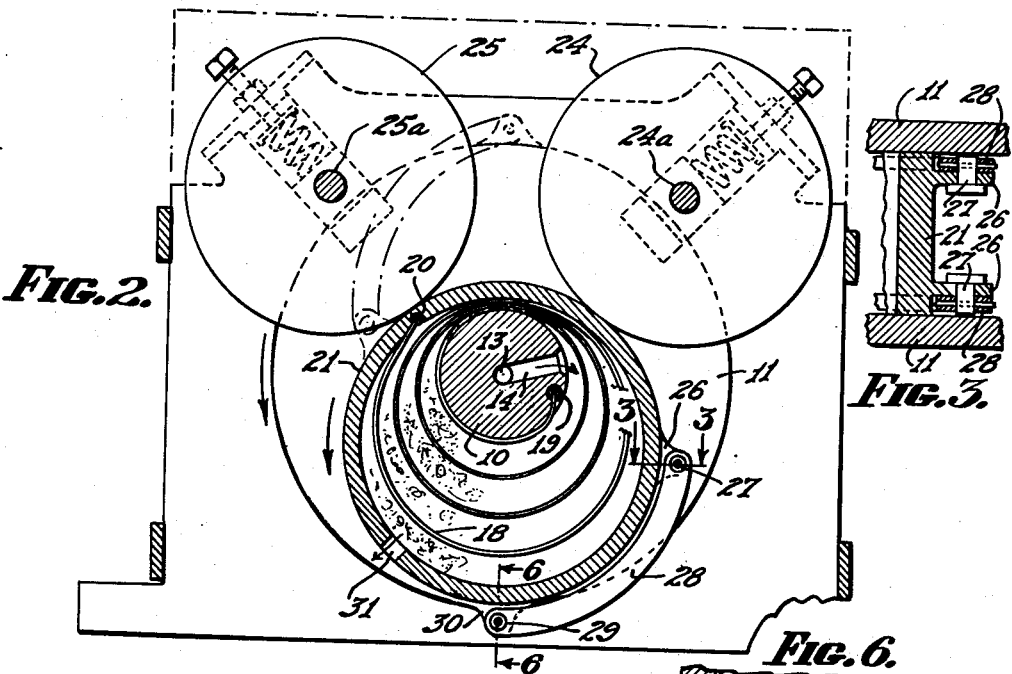
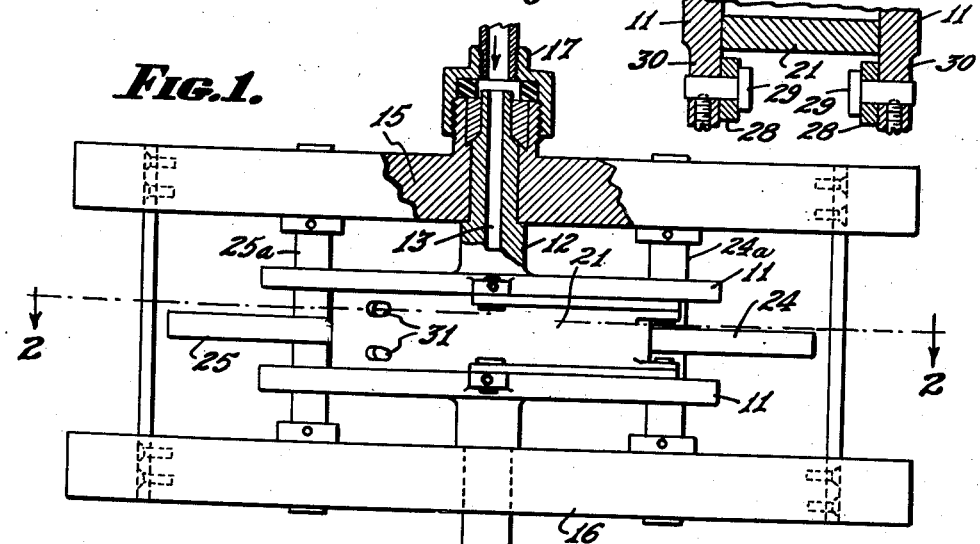
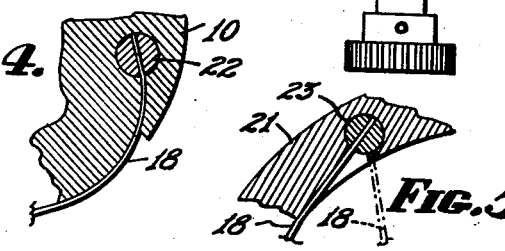
INVENTOR.
SEARS LEHMANN, JR.,
BY
ATTORNEYS.

Oct. 12, 1954     S. LEHMANN, JR     2,691,365
EXPANSION ENGINE
Filed May 21, 1953     6 Sheets-Sheet 2
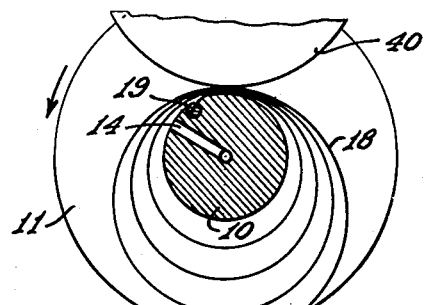
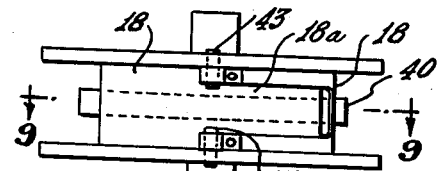
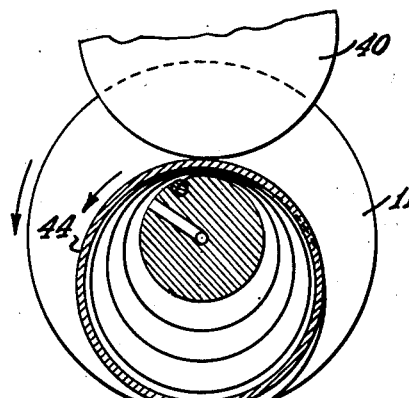
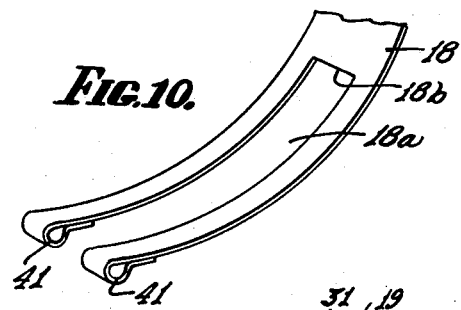
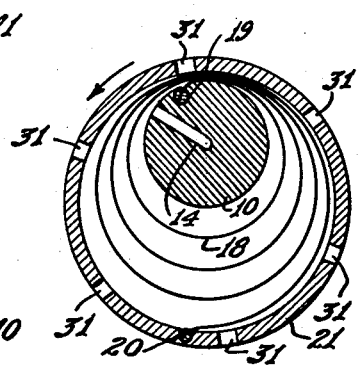
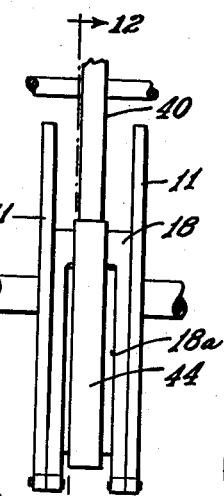
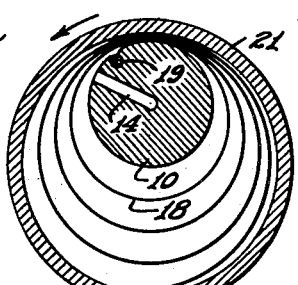
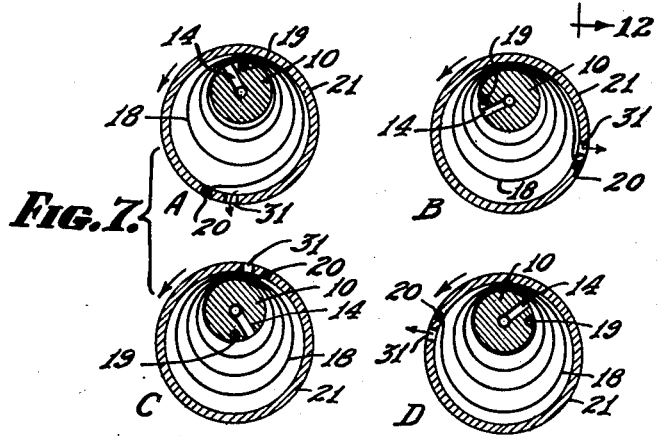
INVENTOR.
SEARS LEHMANN, JR.,
BY
ATTORNEYS.

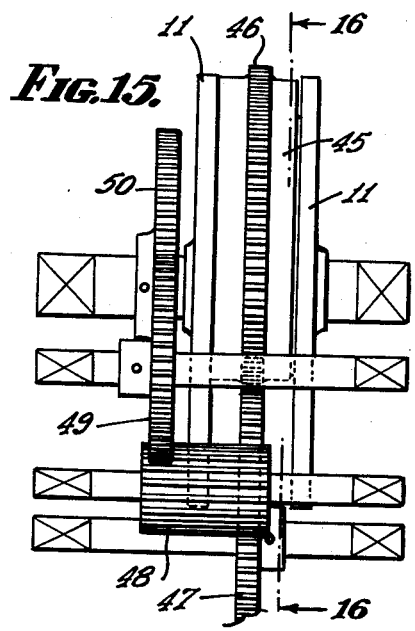
FIG.15.
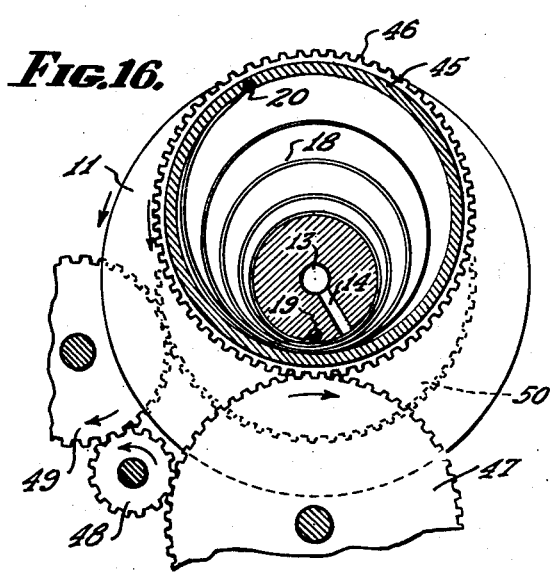
FIG.16.
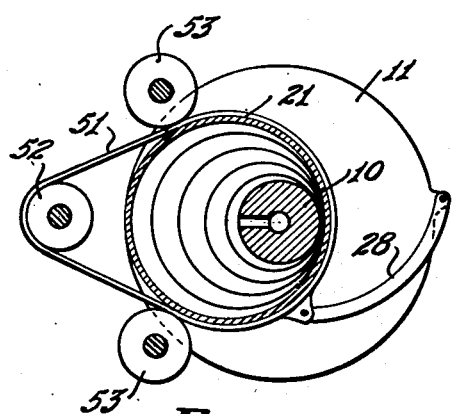
FIG.17.
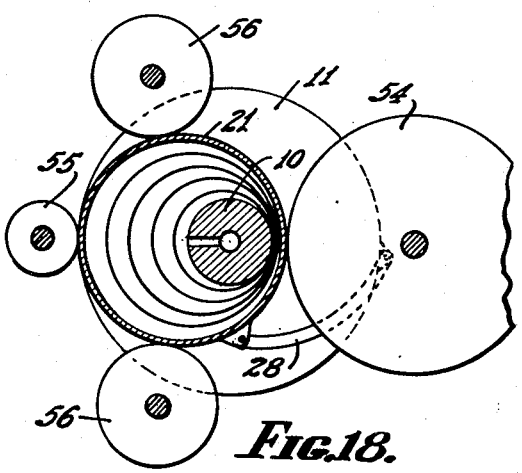
FIG.18.
INVENTOR.
SEARS LEHMANN, JR.,
BY
ATTORNEYS.

Oct. 12, 1954  S. LEHMANN, JR  2,691,365
EXPANSION ENGINE
Filed May 21, 1953  6 Sheets-Sheet 5
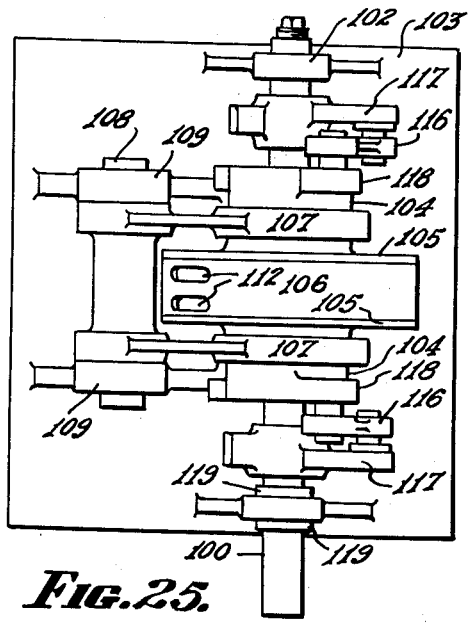
FIG.25.
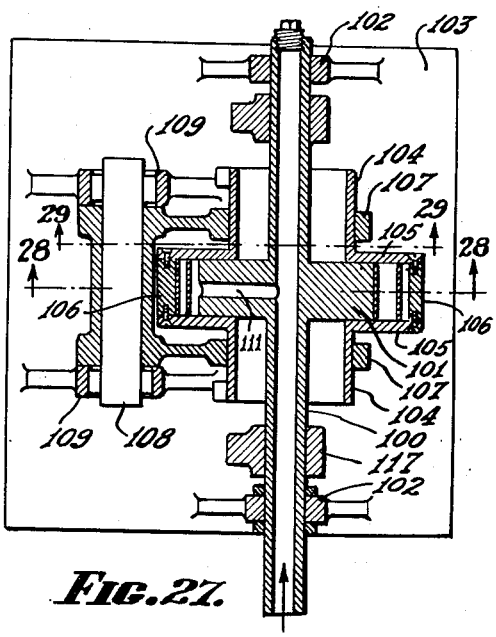
FIG.27.
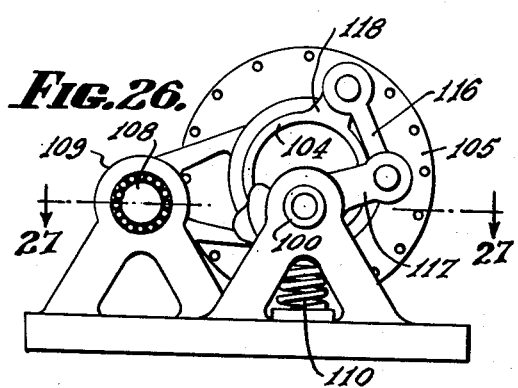
FIG.26.
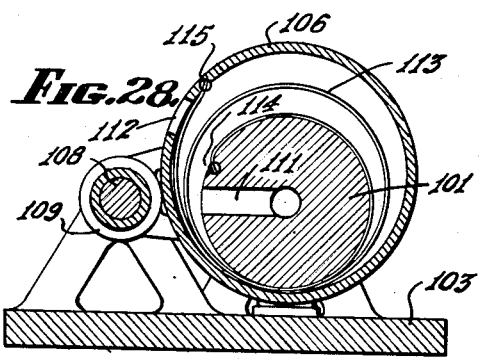
FIG.28.
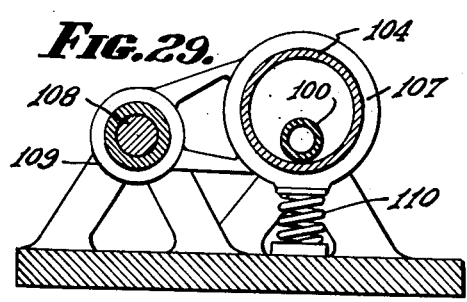
FIG.29.
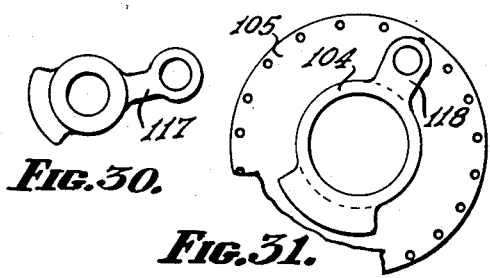
FIG.30.
FIG.31.
INVENTOR.
SEARS LEHMANN, JR.,
BY
ATTORNEYS.

Oct. 12, 1954 S. LEHMANN, JR 2,691,365
EXPANSION ENGINE
Filed May 21, 1953 6 Sheets-Sheet 6

INVENTOR.
SEARS LEHMANN, JR.,
BY
ATTORNEYS.

Patented Oct. 12, 1954

2,691,365

UNITED STATES PATENT OFFICE 2,691,365

EXPANSION ENGINE

Sears Lehmann, Jr., University City, Mo., assignor to Averill-Lehmann Company, St. Louis, Mo., a partnership Application May 21, 1953, Serial No. 356,517

23 Claims. (Cl. 121—48)

This invention relates to an improved expansion engine. In U. S. Letters Patent No. 2,581,830, dated January 8, 1952, in the name of John R. Averill, there was disclosed and claimed an expansion engine designed particularly for the specialized application of improving crude oil gravities. It was pointed out that this engine was susceptible to other uses, but the principal purpose for which it was designed was to take energy from the expanding gases and do external work while reducing the pressure of gas-oil mixtures so as to assist in conserving the lighter ends, and at the same time do work.

The engine of the present invention may be used for similar purposes, although I believe that its main virtue will be as a prime mover or pump or meter rather than the improvement of crude oil gravities.

According to said patent a metallic flexible strip was secured to a flanged hub and made several convolutions around the hub and the other end of the strip was free. The various convolutions of the strip acted as expansion chambers. A friction wheel was arranged to bear against the hub between the flanges to press the strip against the hub and the friction wheel had to be geared to the hub.

It is an object of the present invention to provide an improved engine wherein the end of the strip remote from the hub is secured, and to provide means to insure that the securing means will make one revolution for each revolution of the hub.

It is a further object of the present invention to secure what in the previous patent would be the free end of the strip either to the flanges of the hub, or to a ring constituting a surface of revolution encircling the convolutions of the strip and pressing them against the hub.

In one aspect, therefore, it is yet another object of my invention to provide an arrangement whereby gearing is eliminated.

Other objects of the invention include the provision of means for yoking the ring to the flanges or gearing it to the flanges so as to constrain the ring and flanges to move together.

These and various other objects of my invention which I shall discuss in more detail hereinafter, or which will be apparent to one skilled in the art upon reading these specifications, I accomplish by that certain construction and arrangement of parts of which I shall now describe certain exemplary embodiments.

Reference is made to the drawings forming a part hereof, and in which:

Figure 1 is a bottom view of an expansion engine according to my invention with parts in section;

Figure 2 is a cross sectional view of the same taken on the line 2—2 of Figure 1;

Figure 3 is a fragmentary cross sectional view on an enlarged scale taken on the line 3—3 of Figure 2;

Figure 4 is a greatly enlarged fragmentary sectional view of a portion of the hub of Figure 2 showing the manner of attachment of the flexible strip to the hub;

Figure 5 is a fragmentary cross sectional view on a greatly enlarged scale of a portion of the ring of Figure 2 showing the manner of attachment of the flexible strip to the ring;

Figure 6 is a fragmentary cross sectional view on a greatly enlarged scale taken on the line 6—6 of Figure 2;

Figure 23:
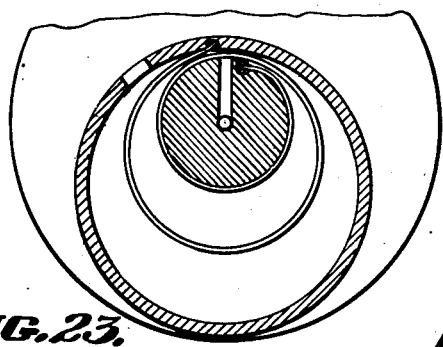
Figure 24:
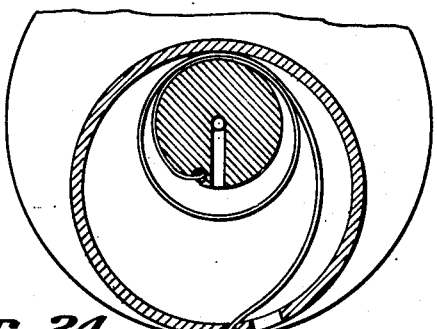
Figure 32:
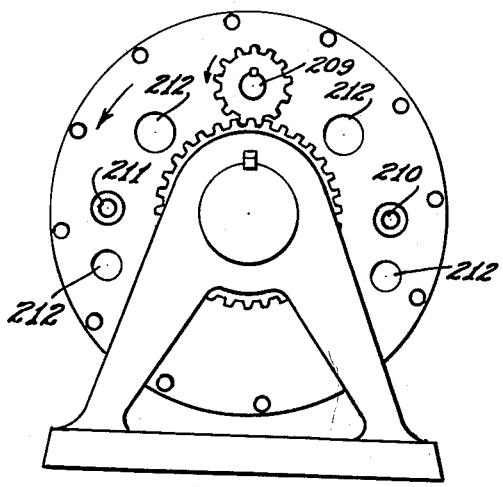
Figure 33:
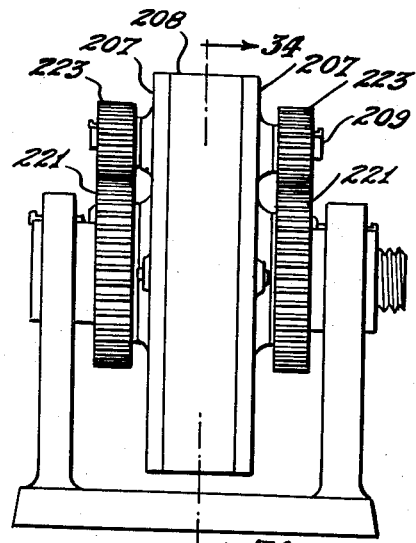
Figure 34:
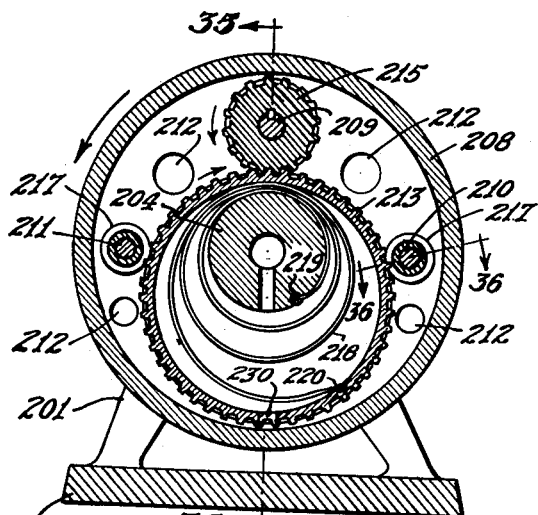
Figure 35:
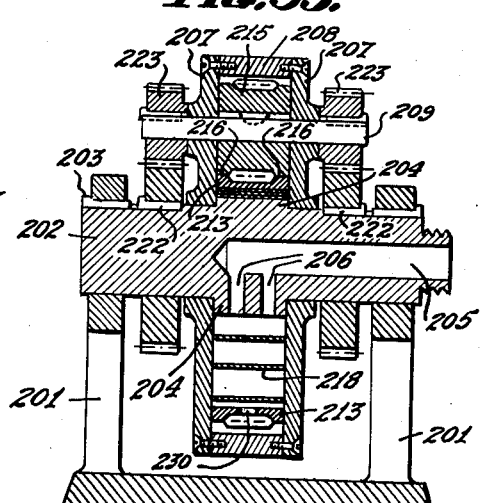

Figure 7 consisting of parts A, B, C and D shows diagrammatically the position of the parts at 90° intervals during a rotation of the hub;

Figure 8 is a bottom view of a flanged hub showing a strip coiled about it where a contact wheel is used;

Figure 9 is a cross sectional view taken on the line 9—9 of Figure 8;

Figure 10 is a fragmentary perspective view on an enlarged scale showing the outer end of the flexible strip;

Figure 11 is a side elevational view of an arrangement similar to Figures 8 and 9 where a ring is used in addition to the contact wheel of Figures 8 and 9;

Figure 12 is a cross sectional view taken on the line 12—12 of Figure 11;

Figure 13 is a somewhat diagrammatical view of a modified structure;

Figure 14 is a view similar to Figure 13 of another modification;

Figure 15 is an elevational view of a modification wherein a gear connection is made between the ring and the hub;

Figure 16 is a cross sectional view of the same taken on the line 16—16 of Figure 15;

Figure 17 is a diagrammatical view of an arrangement wherein a belt is used to hold the ring in contact with the hub;

Figure 18 is a view similar to Figure 17 where a contact wheel is used and a second contact wheel is provided in opposition thereto;

Figures 19, 20, 21 and 22 are diagrammatical views showing the position of the parts at 90° intervals wherein a very short flexible strip is used;

Figures 23 and 24 are diagrammatical views showing the position of the parts at 180° differences in position in a single revolution where an intermediate length of strip is used;

Figure 25 is a plan view of a modification of the invention;

Figure 26 is an end elevation as seen from the bottom of Figure 25;

Figure 27 is a cross sectional view of the same taken on a line 27—27 of Figure 26;

Figure 28 is a cross sectional view of the same taken on a line 28—28 of Figure 27;

Figure 29 is a cross sectional view of the same taken on a line 29—29 of Figure 27;

Figure 30 is a detailed elevational view of one of the crank arms;

Figure 31 is a fragmentary elevational view showing details of one of the boots;

Figure 32 is an end elevational view of another modification;

Figure 33 is an elevational view of the same as seen from the right of Figure 32;

Figure 34 is a cross sectional view taken on a line 34—34 of Figure 33;

Figure 35 is a cross sectional view taken on a line 35—35 of Figure 34; and

Figure 36:
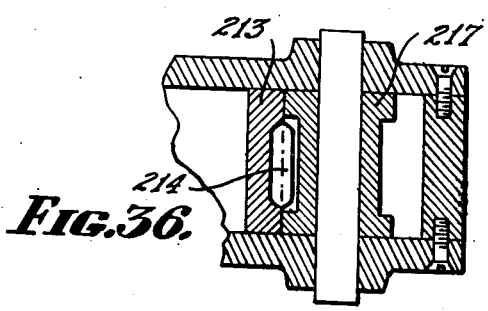

Figure 36 is a fragmentary cross sectional view on an enlarged scale taken on a line 36—36 of Figure 34.

Briefly, as pointed out above, the basic distinction of the present invention over that of the above named Letters Patent resides in the fact that here the outer end of the strip is attached to something. According to one embodiment the outer end of the strip is attached to the flanges directly. According to another group of embodiments the outer end of the strip is attached to the ring encircling the strip.

Where the outer end of the strip is attached to the ring means are provided to connect the ring to the flanges by some positive means such as a pivotal yoke, gearing, sprocket chain, linked crank arms, or other suitable means.

In the series of embodiments where the outer end of the strip is attached to the flanges, a ring may or may not be used. If a ring is used it serves the purpose of containing the convolutions of the strip, but it need not be yoked or geared to the flanges. I have found that the presence of a rigid ring encircling the convolutions of the strip improves the transmission of force in the machine by preventing distortion of the strip.

In all embodiments means are provided to force the ring, where it is used, inward toward the hub. The surface of revolution in some cases is an encircling ring, and in others it is a contact wheel, and in either event means are provided to force the ring or contact wheel inward toward the hub.

Referring now in more detail to the drawings, in the embodiments of Figures 1 and 2 there is provided a hub 10, which is provided with the flanges 11. This hub is mounted upon a shaft 12 which is provided with an axial bore 13 communicating with the radial bore 14 of the hub. The shaft 12 is journaled in the frame elements 15 and 16, and a packing gland arrangement is preferably provided as indicated generally at 17. Since this particular gland forms no part of the present invention it will not be described further.

The flexible strip is indicated generally at 18. The strip 18 is secured to the hub as indicated at 19 and shown in more detail in Figure 4, and the outer end of the strip is secured as at 20 to a ring 21 as shown in greater detail in Figure 5. As indicated in Figures 4 and 5 the ends of the strip 18 may be welded or suitably secured to pins 22 and 23, and these may slip into holes in the hub 10 or ring 21 respectively. In the case of the connection with the ring 21 provision is made so that the strip end may pivot as indicated in the broken lines of Figure 5. At the hub end there is no need for such pivoting action and the strip may simply issue somewhat tangentially through a slot.

In order to urge the ring 21 against the convolutions of the strip 18 and the hub 10, I have shown a pair of contact wheels 24 and 25. The shafts 24a and 25a of the contact wheels respectively are mounted with spring means to urge them against the ring as shown in broken lines in Figure 2. The particular details of this mounting are conventional and will not be described further.

In order to insure that the ring and flanges rotate together I have provided yokes to connect the ring with the flanges. Thus, as best seen in Figure 3, the ring 21 is provided with the upstanding ears 26 to which are pivoted by means of the pins 27 the yoke members 28.

As best seen in Figure 6 the other ends of the yoke members 28 are secured pivotally by means of the pins 29 to upstanding ears 30 on the flanges 11. The yoke members 28 are thus pivoted at one of their ends to the ring, and at their other ends to the flanges so that as the parts rotate the ring and flanges must rotate together, although they do not rotate at all times at the same angular speed. In Figure 2 the broken lines indicate the position of the parts 180° after the position shown in solid lines, and it will be observed that the yoke has swung out from its position substantially along the periphery of the ring 21. Thus, the yoking together of the ring and the flanges with the outer end of the strip secured to the ring eliminates the need for the gearing of the above named Letters Patent. It will be observed that an exhaust port has been indicated in the ring at 31.

The operation of the engine may perhaps best be understood by reference to the composite Figure 7 with the views A, B, C and D showing the parts at 90° intervals during a single rotation. For convenience the parts have been numbered the same as in Figure 2. In the embodiment thus far described the ring is wide enough to fill the space between the flanges. This is the reason for the provision of the exhaust ports at 31. With the ports placed as shown in Figures 2 and 7 the ring completes the outermost convolution of the strip which can then act as an expansion chamber.

It will be observed in Figure 7A that the gases entering through the radial port 14 are just beginning to enter the first convolution about the hub, while the gases in the other convolutions have expanded somewhat. Gases between the point of contact and the point 20 are being forced out through the port 31.

In Figure 7B, 90° later, the innermost convolution is seen as expanding and it will be observed that the gases outside the outermost convolution have been almost completely exhausted through the port 31.

In Figure 7C, the expansion in the various convolutions is continuing and the exhaust port 31 is again accessible for gases outside the outermost convolution of the strip; and in Figure 7D the port 14 is about to be closed, while another convolution has been wrapped tightly around the hub ready for a repetition of the cycle just described.

It will be noted that in the embodiment described in connection with Figures 2 and 7 the ring forms part of the outer expansion chamber and does useful work. The showing in Figure 14 is simply an enlargement of the showing of Figure 7, particularly to illustrate the location of the exhaust port. In the embodiment of Figure 13 where a series of exhaust ports are placed around the periphery of the ring, the space between the ring and the outermost convolution is, in effect, open to atmosphere and therefore, the ring does not form part of the outermost expansion chamber. The same would be true if the ring 21 were of less width than the space between the flanges. In such case the gases passing beyond the strip could simply bypass the ring to atmosphere.

In Figures 8–10 inclusive I have shown an embodiment where the strip is secured directly to the flanges and no ring is used. In this embodiment the surface of revolution, which urges the strip against the hub, is a contact wheel 40. The same reference numerals are again applied to the hub, flanges and strip because they are the same as in other embodiments. In this case the outer end of the strip is formed, as best seen in Figure 10, where a slot 18a is provided and ears 41 are provided at the end of the strip. The ears 41 are attached to upstanding lugs 42 on the flanges 11 by means of pins 43. It will be clear that the slot 18a provides a space for the contact wheel 40 which rides on the strip 18 and presses it against the hub 10. When the end of the strip, which is secured to the flanges, passes under the contact wheel the wheel rides in the slot 18a and passes between the lugs 42.

The embodiment of Figures 11 and 12 is similar to that of Figures 8 and 9 and the strip end again is slotted as at 18a, but in this instance a ring 44 is provided simply to contain the convolutions of the strip. In this instance the slot 18a permits the ring 44 to pass the lugs 42 on the flanges.

In Figures 15 and 16 I have shown an arrangement where instead of the ring being yoked to the flanges it is connected by a system of gears. This embodiment also demonstrates the situation where the ring is narrower than the space between the flanges so that the provision of exhaust ports is not required.

As shown in Figures 15 and 16 the ring 45 is provided annularly with the gear teeth 46. The gear teeth 46 mesh with a gear 47 and motion is transmitted through the gears 48 and 49 to a gear 50 which is fast on the hub shaft. The flanges of course being fixed to the hub shaft, the motion is transmitted from the ring to the flanges. In this embodiment the flanges and ring rotate at constant angular speeds, and in this respect the embodiment of Figures 15 and 16 differs from that wherein a pivoted yoke is provided.

Figure 17 is a diagrammatic showing of a different arrangement for urging the ring against the hub. For purposes of illustration, I have here illustrated the yoked arrangement described above. In this embodiment a belt 51 passes around the ring 21 and also around a pulley 52. The auxiliary pulleys or wheels 53 may be provided to bear against the outside of the belt 51 and against the ring 21 to prevent the ring from oscillating up and down as seen in Figure 17.

Figure 18 is a diagrammatic representation of another variation where the contact wheel 54 is used to urge the ring 21 against the convolutions of the strip and the hub, but where it may be desired to allow a positive space between the ring and the hub. For this purpose a smaller wheel 55 is mounted in opposition to the wheel 54 so that the amount of space between the ring 21 and hub 10 may be controlled. Again, small wheels 56 may be provided to prevent oscillation of the ring.

Figure 19:
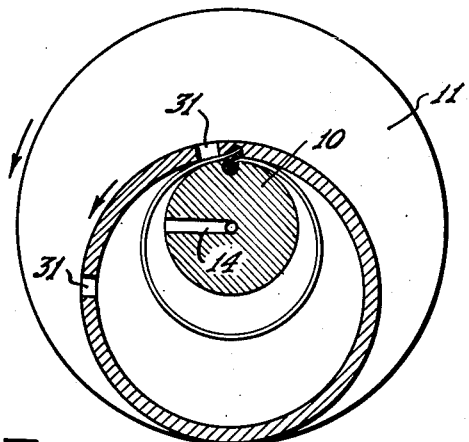
Figure 20:
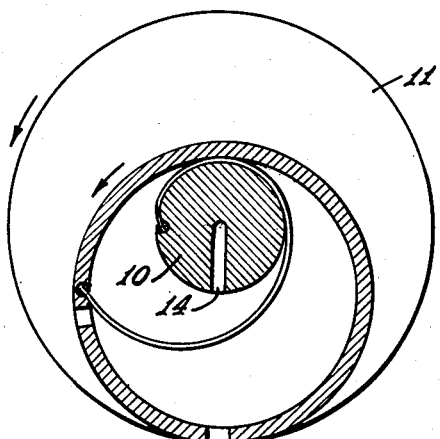
Figure 21:
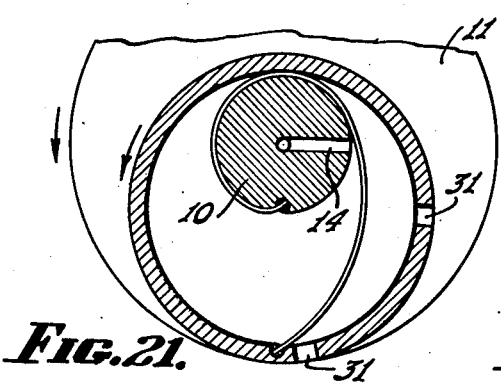

Figures 19–22 inclusive are diagrammatic and illustrate four stages in a revolution of an engine where the length of the strip is more than the circumference of the hub, but less than twice the circumference of the hub. It will be observed in these figures that there is never more than a single expansion chamber functioning at any time. In Figure 19 the gases entering the radial port 14 are working in the single convolution and expanding therein. The space outside of the convolution is vented to atmosphere through the port 31. In Figure 20 the expansion chamber is shown as increasing in size, and it will be observed that the inner end of the strip is again being wrapped tightly around the hub. In Figure 21 the inner end of the strip is wrapped almost three-quarters of the way around the hub and the port 14 is about to be closed. The expansion chamber is now almost full.

Figure 22:
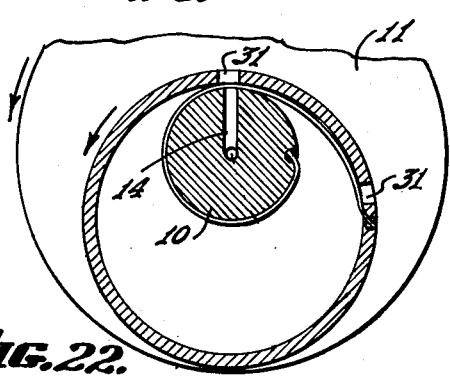

In Figure 22 the expansion chamber is completely full, and the radial port 14 is in a position where it is about to open and start the cycle over again as shown in Figure 19.

In Figures 23 and 24 I have illustrated a modification very similar to Figures 19–22 except that here I show an intermediate length of strip. In the showing of Figure 23 the first expansion chamber is partway expanded and upon a slight turn of the hub in a counterclockwise direction the second expansion chamber will be started. In Figure 24 the situation is shown 180° later where the outer expansion chamber is almost completely full, and the inner expansion chamber is growing. In this embodiment there is at all times at least one working expansion chamber, and throughout most of the cycle there are two expansion chambers.

In Figures 25–31 inclusive I have disclosed a modification wherein instead of a flanged hub and an annular surface of revolution, I have disclosed a flanged surface of revolution and a simple disc-like hub. A study of this modification will bring out the point that it is not important that the flanges be integral with or secured to the hub because as shown the flanges may be integral with or secured to the annular surface of revolution. It is only important that there be a hub and an annular surface of revolution, and that there be flanges of some sort to seal against the surface of revolution and the hub so as to provide a crescent shaped chamber within which the flexible element may operate.

In this embodiment I have shown a hollow shaft 100 having a hub 101 solidly mounted thereon or integral therewith, and I have shown the shaft 100 mounted in the bearings 102, which are suitably secured to a base or platform 103. At 104, I have shown a pair of flanged boots having the flanges 105, which flanges are bolted solidly to the ring 106, which in this embodiment constitutes the contacting surface of revolution. The boots 104 are rotatably mounted in bearings 107 which are rigidly connected to the shaft 108. The shaft 108 in turn is pivotably mounted in the bearings 109 mounted on the plate 103. The ring 106, constituting the contacting surface of revolution, is forced into contact with the hub 101 by means of springs 110 which act upwardly on the bearings 107.

As best seen in Figures 27 and 28 a radial passage 111 is provided, connecting the hollow shaft 100 and the crescent shaped chamber between the hub 101, the ring 106 and the flanges 105. In Figure 28 an exhaust port may be seen at 112. Also, in Figure 28, the flexible strip 113 is shown as being anchored to the hub 101 at 114 and to the ring 106 at 115. At 116 there are shown links which connect crank arms 117 with the crank arms 118 on the flanged boots 104. The crank arms 117 are keyed to the shaft 100. As will clearly appear in the figures the various crank arms and links are shown as being counterweighted in order to provide for balance of the assembly.

The cooperation of the crank arms 118 on the boots 104, the links 116 and the crank arms 117 enforces upon the ring 106 one revolution for each revolution of the hub 101. Lock rings 119 are provided on the shaft 100 to prevent its wandering axially.

In the embodiment of Figures 25-31 inclusive, the gases enter the crescent shaped chambers formed by the hub, strip, flanges and ring through the hollow shaft 100 and the passage 111. The gases expand in these crescent shaped chambers and exhaust to atmosphere through the port 112. During the course of their expansion they drive the hub, flanges and ring.

In Figures 32-36 inclusive I have shown yet another modification wherein a planetary gear system is used to attain a one-to-one linkage between the hub and the ring. In this embodiment it should be noted that the flanges are attached neither to the hub nor to the contacting surface of revolution. However, the flanges seal against both the hub and the surface of revolution.

In this embodiment the apparatus is mounted on a platform 200 by means of standards 201. The standards 201 are bored to support a shaft 202 which is keyed to the members 201, as at 203, so as to be fixed with relation to the standards. A hub 204 is solid or integral with the shaft 202. The shaft 202 has an axial bore 205 communicating with radial passages 206.

The flanges 207 are freely rotatable on the shaft 202 and thus, are freely rotatable with respect to the hub 204. At their periphery they are bolted to a casing ring 208. The flanges 207 are provided with bearings for the shaft 209, 210, 211, and they are provided with the exhaust ports 212.

In this embodiment the ring or contacting surface of revolution is indicated at 213, and as will be observed, particularly in Figure 34, the member 213 is smooth on its interior surface and is provided with gear teeth on the central portion of its exterior surface. Such a gear tooth is indicated at 214 in Figure 36. The ring 213 is arranged to mesh with the teeth of the internal planetary gear 215 mounted on the shaft 209. The edges of the gear 215 and the ring gear 213 are formed to provide smooth rolling surfaces having diameters corresponding to the pitch diameters of the respective gears. The contacting rolling surfaces are illustrated in Figure 35 at 216. These rolling surfaces serve to maintain proper tooth clearance, and the rolling pressure between these surfaces urges the ring 213 against the convolutions of the strip and the hub 204 so that a crescent shaped chamber is formed between the ring gear 213, the hub 204 and the flanges 207.

Idling rollers are shown at 217 mounted on the shafts 211 and 210, and as best seen in Figure 36 these idling rollers are recessed in their central region so as to clear the teeth 214 of the ring gear 213. (See Fig. 36). These rollers are free to rotate on their shafts 210 and 211 and have the function only of stabilizing the relative position and motion of the ring gear 213.

The flexible strip is indicated at 218 in Figure 34 and it is secured to the hub 204 at 219 and to the ring gear 213 at 220. The strip thus forms crescent shaped expansion chambers in cooperation with the hub 204, the flanges 207 and the ring gear 213.

It should be observed that the ring gear 213 is the actual working contacting surface of revolution, while the casing ring 208 has only the function of positioning the two flanges with respect to one another.

Gears 221 are keyed as at 222 to the shaft 202, and they mesh with the pinions 223 which are keyed to the shaft 209, as is also the planetary gear 215. The gears 221 and 223 are simply external planetary timing gears. If the ratio of the pitch diameter of the gear 221 to the pinions 223 is the same as the ratio of the pitch diameter of the ring gear 213 to the planetary gear 215, then it will be understood that the ring 213 will not rotate with respect to the hub 204. Thus, the relative rotation of the ring 213 and the hub 204 is the same, namely both zero. The point of contact between the ring gear 213 and the hub 204 will, however, rotate about the hub 204 as the flanges rotate thereabout.

In operation, gas under pressure enters through the axial bore 205 in the shaft 202 and passes through the radial passages 206 into the crescent shaped expansion chambers between the hub, the flexible strip and the flanges. As the gases expand the contact point between the ring gear and the hub, as well as the flanges, are forced to rotate about the stationary shaft 202 and the hub 204. After expansion the gases exhaust through the port 230 in the ring 213 and thence through the ports 212 in the flanges 207. In this modification of my invention it will be seen that no stuffing box is required on the shaft for the introduction of fluids under pressure.

It will be understood that the weights of the ring 213 and of the assembly consisting of the shaft 209 with its three gears 215 and 223 are chosen in such manner as to balance with each other about the axis of rotation so as to provide dynamic balance and eliminate unnecessary vibration.

It will be clear from what has gone before that numerous modifications may be made in various details of the engine without departing from the spirit of my invention. I wish it to be understood therefore, that I do not limit myself in any manner other than as set forth in the claims which follow.

Having now fully described my invention what I claim as new and desire to secure by Letters Patent, is:

1. A machine comprising a hub, an impervious strip of flexible material of substantially the width of said hub, said strip being secured at one of its ends to said hub and coiling loosely around said hub, means securing said strip at its other end, a surface of revolution having a width not greater than the width of said hub and contacting said strip on the outside surface of the outermost convolution of said strip, and a pair of flanges extending between said hub and outermost convolution of said strip, means forcing said surface of revolution toward said hub to pinch the respective convolutions between said surface of revolution and said hub to form a series of crescent shaped expansion chambers, between said hub, flanges, and strip, means to enforce upon said securing means one revolution for each revolution of said hub, a duct leading into the space between said hub, flanges and the innermost convolution of said strip, and means venting the outermost crescent shaped chamber to atmosphere.

2. An expansion engine comprising a flanged hub, an axial passage in said hub and a radial port in said hub communicating with said passage, an impervious strip of flexible material, of substantially the width of said hub between said flanges, said strip being secured at one of its ends to said hub, and means securing said strip at its other end, a surface of revolution contacting said strip, and means pressing it against said hub, and means to enforce upon said securing means one revolution for each revolution of said hub.

3. An expansion engine according to claim 2 wherein said surface of revolution is the inner surface of a ring.

4. An expansion engine according to claim 3 wherein said securing means secures the other end of said strip to said ring, and means are provided to enforce upon said ring one revolution for each revolution of said hub.

5. An expansion engine according to claim 4 wherein said enforcing means comprise a yoke pivotally secured to said ring at one end and pivotally secured to said flanges at the other end, said flanges being fixed with respect to said hub.

6. An expansion engine according to claim 4 wherein said enforcing means comprise gear teeth on said ring, a gear fixed with respect to said hub, and gearing to transmit rotation from said hub gear to said ring gear.

7. An expansion engine according to claim 2, wherein said securing means secures the other end of said strip to said flanges, said flanges being fixed with respect to said hub.

8. An expansion engine according to claim 7, wherein said surface of revolution is a wheel, and provided with means to urge said wheel against said hub, the end of said strip which is secured to said flanges having a slit of such width and length as to permit passage of said wheel over said strip and past said securing means.

9. An expansion engine according to claim 7, wherein said surface of revolution is the inside surface of a ring, and a contact wheel is provided to ride on said ring, with means urging said contact wheel against said ring and hub.

10. An expansion engine according to claim 2, wherein said surface of revolution is the inner surface of a ring, and wherein the means pressing said ring against said hub, includes a contact wheel.

11. An expansion engine according to claim 10, wherein the action of said last named contact wheel is opposed by another roller, said two last named rollers being diametrically opposed with respect to said ring.

12. An expansion engine according to claim 11, wherein additional rollers are provided to bear against said ring on each side of a line connecting the axes of said diametrically opposed rollers, to prevent oscillation of said ring.

13. An expansion engine according to claim 2, wherein said surface of revolution is the inner surface of a ring, and wherein the means pressing said ring against said hub includes a belt and a pulley rotatable about a fixed axis, said belt passing around said ring and said pulley.

14. An expansion engine according to claim 13, wherein additional pulleys are provided on each side of a line connecting the axes of said first named pulley and hub, to bear against the outside of said belt to prevent oscillation of said ring.

15. An expansion engine according to claim 2, wherein said surface of revolution is the inner surface of a ring, said ring being of less width than the distance between the inside faces of said flanges.

16. An expansion engine according to claim 2, wherein said surface of revolution is the inner surface of a ring, said securing means securing the other end of said strip to said ring, said ring being of a width to fit snugly between said flanges, and said ring having an exhaust port in advance of said securing means in the direction of rotation of said ring.

17. An expansion engine according to claim 16, wherein said ring is provided with a series of exhaust ports around its periphery.

18. An expansion engine according to claim 2, wherein the length of said strip is such as to provide a plurality of loops about said hub.

19. An expansion engine according to claim 2, wherein the length of said strip is such as to provide for two loops around said hub.

20. An expansion engine according to claim 2, wherein the length of said strip is of a length greater than the circumference of the hub but less than twice the circumference of the hub.

21. A machine according to claim 1, wherein said securing means secure the other end of said strip to said surface of revolution, said surface of revolution being a ring, said flanges being secured to said ring and rotatably supported, and a linkage connecting said flanges with said hub so as to enforce upon said ring one revolution for each revolution of said hub.

22. A machine according to claim 1, wherein said surface of revolution is an externally toothed ring and said securing means secure the other end of said strip to said ring, said flanges being freely rotatable with respect to said hub and ring and carrying a shaft having a gear keyed thereto between them, said gear having operative engagement with the teeth on said ring, said hub being non-rotatably mounted and carrying a gear in fixed relation, and said flanges carrying an external gear also keyed to said shaft and meshing with said hub-mounted gear, the ratio of the pitch diameters of said hub-mounted gear and the flange mounted external gear meshing therewith being equal to the ratio of the pitch diameters of said toothed ring and the flange mounted gear meshing therewith, whereby neither said ring nor said hub rotate, but the contact point between them moves in a planetary orbit.

23. A machine according to claim 22 wherein a casing ring is secured between said flanges about said toothed ring and the gear meshing therewith, said casing being provided with exhaust ports, and there being an exhaust port in said toothed ring.

No references cited.